Nov. 7, 1967

R. P. HARRIS ETAL 3,351,783

MEANS FOR SIMULATING LEARNING, FORGETTING
AND OTHER LIKE PROCESSES

Filed June 21, 1965

INVENTORS
ROBERT P. HARRIS
JEROME L. KRASNER
BY *Charles B. Haverstock*
ATTORNEY

United States Patent Office 3,351,783
Patented Nov. 7, 1967

3,351,783
MEANS FOR SIMULATING LEARNING, FORGETTING AND OTHER LIKE PROCESSES
Robert P. Harris, St. Louis, Mo., and Jerome L. Krasner, Fort Collins, Colo., assignors, by mesne assignments, to Conductron Corporation, Ann Arbor, Mich., a corporation of Delaware
Filed June 21, 1965, Ser. No. 465,554
13 Claims. (Cl. 307—88.5)

ABSTRACT OF THE DISCLOSURE

An electronic circuit for simulating learning, forgetting and other similar processes including means for storing input information represented by input signals at a variable first rate, means for forgetting previously stored information at a variable second rate, means for producing outputs whenever a preselected amount of information has been stored, and means for accelerating the forgetting rate even to the point of inhibiting the learning process. The same or similar electronic means and process can be used to simulate other processes as well including human responses to environmental and other conditions.

---

Figure 1:
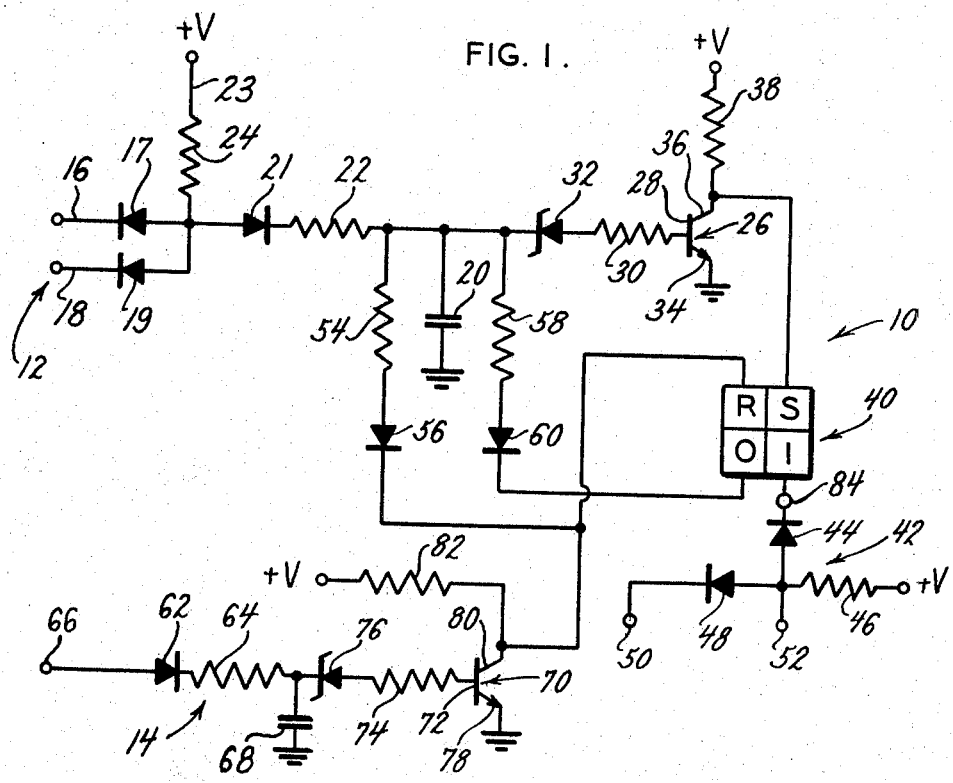

The present invention relates generally to electronic circuits and the like and more particularly to an electronic circuit capable of simulating the human learning process as distinguished from a memory or storage process. More particularly, the present invention relates to a device capable of learning and forgetting information at the same or at different rates, and capable of using present as well as previously learned information in a decision making process.

Many devices including electronic devices or circuits have been constructed and used in the past for storing, remembering, accumulating and even forgetting or eliminating information. So far as known, however, it has not been proposed heretofore to construct a circuit having learning, remembering and forgetting characteristics the rates of each of which are adjustable. The operation of the present device can therefore to some extent be made to simulate the human learning processes by which a person learns new things relatively more rapidly than he forgets them. This means that the subject device is able to retain a diminishing recollection of information it receives and is able to combine this recollection with newly received information in a decision making process. The present device is capable of being constructed to respond to any number of different inputs or conditions each of which may have some effect on its operating characteristics and decision making or control functions. The present device can also be used to control or monitor many different devices or condtions such as warning devices, operating processes, machine operations and the like.

It is therefore a principal object of the present invention to provide electronic means capable of simulating human learning and decision making processes.

Another object is to provide electronic means capable of retaining a decreasing remembrance of past stimulations.

Another object is to provide means capable of responding to stimulations at a different rate than it forgets them.

Another object is to provide more accurate means for evaluating a history of information.

Another object is to provide electronic means capable of responding to the history of one or more conditions in a decision making process.

Another object is to provide electronic means capable of being adjusted to retain a decreasing recollection of past stimulations.

Another object is to provide relatively inexpensive yet versatile and reliable means for evaluating information.

Another object is to provide means for monitoring and evaluating information taking into account any desired number of conditions, and capable of producing outputs reflecting the composite of the total history of all monitored conditions.

Another object is to provide an electronic circuit having learning and forgetting capabilities and capable of being adjusted to have a desired learning rate and a desired forgetting rate.

Another object is to provide electronic learning means capable of operating on real and on stored time and capable of making decisions based on present information as well as accrued experience due to a history of stimulations.

Figure 2:
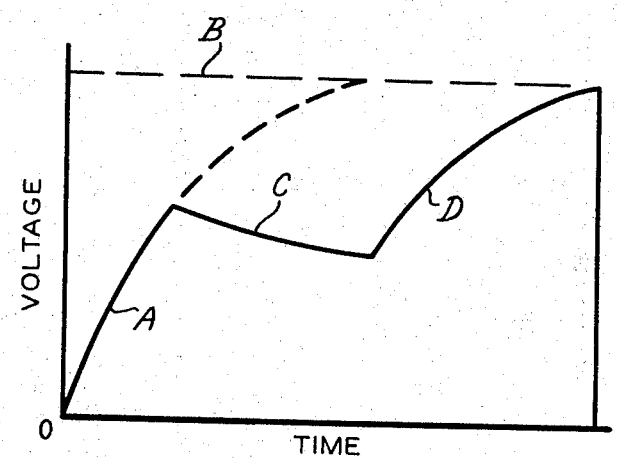

These and other objects and advantages of the present invention will become apparent after considering the following detailed specification which covers a preferred embodiment thereof in conjunction with the accompanying drawing, wherein:

FIG. 1 is a schematic diagram of a circuit constructed according to the present invention; and FIG. 2 is a graph of voltage versus time portraying a typical learning-forgetting curve.

Referring to the drawing more particularly by reference numbers, the number 10 refers to a circuit constructed according to the present invention. The circuit 10 includes an input channel 12 which is stimulated by input signals from a particular source reflecting a particular condition or information bit. These input signals are received and stored in the circuit 10 as will be shown. Each newly received input signal has a continuing residual effect on the circuit which is cumulative to produce a decreasing remembrance of the past history of input signals. This past history is made use of in the present device to simulate the human learning process. Any number of circuits similar to the circuit 10 can be provided depending upon the number of different conditions or information bits to be monitored. The circuit 10 also includes a second channel 14 which is provided to erase or punish the past history of stimulations under certain conditions in order to accelerate the forgetting characteristics.

The input circuit 12 receives digital input signals on leads 16 and 18 which are connected to rectifiers 17 and 19 respectively which form an "and" gate. When an "and" condition exists at these inputs a charge is accumulated on a capacitor 20 which is part of an integrating circuit. The charging current is from biasing source +V and passes through another rectifier 21 and a resistor 22. The inputs received on lead 16 are a result of the normal input stimulations reflecting the condition being monitored, and the inputs received on lead 18 are used as reward stimulations to reinforce the main inputs and in combination therewith to charge the capacitor 20. If the input signals applied on the leads 16 and 18 are of such short duration that the capacitor 20 is unable to charge to a predetermined threshold value before the signals are over, then the charge on the capacitor will thereafter decay. The rate of the decay of the charge on the capacitor is usually relatively slower than the charging rate and therefore the capacitor will retain a short term memory of past inputs. If the capacitor 20 has not fully discharged by the time the next input signal is received the new signal will start recharging the capacitor beginning with the then existing charge. It will not take as much this time to charge the capacitor 20 to the predetermined threshold condition, however. Eventually an input signal may be sufficient to charge the capacitor 20 to the threshold and when this occurs an output will be produced to energize a threshold circuit which will be described later.

The rates at which the capacitor 20 charges and discharges in the absence of attaining a threshold charge is important because it enables the circuit to retain a decreasing recollection of the past history of stimulations. The rate at which the capacitor 20 discharges is dependent on the characteristics of the capacitor itself and also more importantly on the impedance to ground which can be selected to produce the desired condition. Usually the impedance to ground will be selected to produce a discharge rate that is substantially slower than the charging rate so that the capacitor 20 will retain a recollection of past stimulations. This means that the capacitor will charge or learn faster than it discharges or forgets. The relative durations of the learning and forgetting periods, however, can be adjusted as desired. Note also that the capacitor will charge at a faster rate the less charge it has on it and will discharge at a faster rate the greater its charge. By the same token, if the capacitor has a residual charge, it will be able to reach the threshold condition more rapidly than otherwise. Once the capacitor has been charged to the threshold condition so that an output signal is produced, it may then be desirable to discharge the capacitor relatively rapidly so that it can start over again.

A threshold condition is recognized by a threshold circuit which includes a transistor 26 having its base electrode 28 connected to the positive side of the capacitor 20 through a series circuit including resistor 30 and zener diode 32. Another electrode 34 of the transistor 26 is grounded, and the third transistor electrode 36 is biased to an operating condition through a bias resistor 38. The electrode 36 is also connected to an input such as the set input of a flip-flop circuit 40. Whenever the capacitor 20 charges to a predetermined threshold condition the transistor 26 will conduct, and in so doing will provide an output to energize or transfer the flip-flop circuit 40 from its reset to its set condition. This in turn will produce an output from the flip-flop circuit in an output gate circuit 42.

The gate circuit, which may be an "and" gate, includes a first diode 44 which is biased into an operating condition by a voltage applied through a resistor 46. The gate circuit 42 also has a second diode 48 which is connected to a second source of signals at terminal 50. The output of the gate circuit 42 is taken at terminal 52 when the necessary input conditions are fulfilled. The input signal at the terminal 50 can be the same signal as at the input lead 16 or it can be taken from another circuit of the same or of different construction. In this way a number of similar circuits can be connected to operate in parallel depending upon the number of input stimulations or conditions to be monitored and the levels of outputs desired. Also the entire circuitry can be made instantly sensitive to inputs at terminal 50 following the time dependent action necessary to an input condition at terminal 84. Tandem connected circuits can also be used to monitor different conditions.

The flip-flop circuit 40 also has other circuit connections and serves other functions. For example, the reset input (R) to the flip-flop is connected to the output of the erase or punish circuit 14 to reset the flip-flop under certain conditions. The erase circuit 14 also operates in conjunction with a series circuit including resistor 54 and diode 56 to provide an accelerated discharge path for the capacitor 20 whenever the punish circuit 14 is excited. The output of the circuit 14 is connected to the diode 56 and also to the reset input (R) of the flip-flop circuit 40. The details of the circuit 14 will be described later.

Another series circuit including resistor 58 and diode 60 is connected across the capacitor 20 from its positive side to another terminal on the flip-flop circuit 40. This circuit provides means to extinguish the short term memory of the capacitor 20 whenever a threshold condition is obtained.

Under certain circumstances the subject circuit may determine that a particular input signal is unwanted and may desire to punish itself by causing it to forget the unwanted response as quickly as possible. Channel 14 is provided to enable the circuit to accomplish this. The channel 14 has an input which includes a diode 62 and a resistor 64 in series between a source of punishment signals 66 and a grounded integrating capacitor 68. The output of this circuit is connected to another threshold circuit which includes a transistor 70 having its base electrode 72 connected to the positive side of the capacitor 68 through series connected resistor 74 and zener diode 76. Another transistor electrode 78 is grounded, and the third electrode 80 is biased into a positive operating condition through a biasing resistor 82. The electrode 80 is connected to the reset input of the flip-flop circuit 40. In order to erase a charge on the capacitor 20 using the circuit 14 it is only necessary to energize the threshold transistor 70 to cause it to conduct. When this occurs a relatively low impedance discharge path is provided to accelerate the discharge of the capacitor 20. The discharge path is through the resistor 54, the diode 56, and the transistor 70. The impedance of this circuit is selected to accelerate the discharge of the capacitor 20 whenever the threshold condition of the circuit 14 is exceeded. It is also possible by properly energizing the circuit 14 to inhibit or completely prevent the learning channel 12 from retaining a recollection of its past history. The channel 14 can therefore be adjusted to act as a control on the learning operation of the subject circuit. It is also noteworthy that the channel 14 may be constructed substantially the same as channel 12.

FIG. 2 is a graph which illustrates for a possible input-time situation the charging and discharging characteristics of the capacitors 20 and 68. The portion of the curve marked A illustrates the relatively rapid charging rate of the capacitors from a zero charge condition toward the threshold condition B. If an input is not sufficient to charge the capacitor to the threshold condition B the capacitor will begin to discharge but at a slower rate as soon as the input signal ends. The graph of FIG. 2 illustrates a relatively fast learning rate A compared to a relatively slower forgetting rate C. If another input is received before the capacitor is fully discharged, the capacitor will again begin to charge starting with the remaining charge that exists on it at the time the later input is received. This is illustrated by line D in FIG. 2. Thereafter, should the charge reach the threshold condition B the associated threshold transistor 26 or 70 will conduct. In the case of transistor 26 an output will be fed to set input (S) of the flip-flop circuit 40, and in the case of transistor 70 a low impedance discharge path will be provided for the capacitor 20 and flip-flop 40 will be reset. If the transistor 70 conducts before the threshold of the transistor 26 is reached the capacitor 20 will discharge at an accelerated rate.

As noted, the input to the subject circuit can be replaced by another similar circuit or gating device and the output from the flip-flop circuit 40 can be taken directly at output terminal 84 eliminating the output gate 42. The output can also be used to control an operating device or circuit such as a device to turn on a warning or indicator light to indicate the presence of a particular condition or combination of conditions.

The erase or punishment circuit 14 can also be made to vary the rate or degree of punishment it provides, and under certain circumstances it can be eliminated altogether. The threshold circuits including the transistors 26 and 70 can also be substituted by other suitable threshold devices without changing the basic nature of the invention. Other circuits which can be substituted for the threshold circuits include vacuum tube circuits, thyratron circuits, voltage regulator circuits and many others. The integrating circuits which include the capacitors 20 and 68 can also be substituted by other integrating or voltage varying circuits and by mechanical integrators. In fact, it is not essential that an integrator circuit as such be used as long as means are provided by which a voltage decreases at a desired rate in relation to the speed at which the same voltage builds up. Capacitor integrators are preferred, however, because they have the desired characteristics and are relatively inexpensive. Test circuits have also been constructed and operated in which either the circuit formed by the resistor 54 and the diode 56 or the circuit formed by the resistor 58 and the diode 60 are eliminated. When this is done some performance degradation may result.

The present circuit represents a new concept in the use of electronic means to simulate human learning and forgetting processes. The subject circuit can also be expanded to respond to any number of different stimulations or conditions and the learning and forgetting responses can be individually adjusted for each response circuit and the responses of all the circuits can be combined in many different ways to produce individual or total circuit outputs.

One application which will illustrate a possible use for the subject circuit is as a means to monitor the environmental and other conditions which affect the safety, comfort and responses of humans in dangerous environments such as when traveling in air or space vehicles. For example, a person traveling in a space vehicle must have a supply of oxygen, his body must not be exposed to dangerous temperatures and pressures, exposure to radiation may affect his safety, the attitude and flight characteristics of the vehicle may have a bearing on his safety and comfort, and it may be important to monitor his blood pressure, pulse and so on. Each of these conditions may have one or more threshold levels which if reached will affect the safety or comfort of the pilot or astronaut. In the case of the oxygen supply, for example, an astronaut may be able to withstand one or more momentary interruptions or reductions without harm whereas a prolonged interruption or several interruptions spaced in time may weaken him to a point where he would not be able to withstand further interruptions. Under these circumstances it would therefore be important to retain a remembrance of the past history of reductions or interruptions of the oxygen supply and the frequency and extent of such reductions or interruptions in order to determine if the astronaut is in danger and the extent of such danger. This history of past interruptions, however, is slowly forgotten. A circuit such as the present circuit is able to take into consideration both the extent of the oxygen losses and the frequency thereof and one or more threshold levels can be established to energize warning lights or to operate controls as desired. For example, different arbitrary threshold conditions can be established to indicate a condition requiring caution, a condition wherein the astronaut or some automatic control should function to turn on a reserve oxygen supply, and a condition requiring that the flight be terminated as soon as possible. Coupled with the oxygen warning means described would be other similar circuits to monitor temperature, pressure, radiation and any other conditions. Each monitoring circuit operates independently and produces its own history. The outputs of any number of these circuits can be combined to energize suitable warning or other types of controls. The subject circuits can also be used to control many different kinds of operations or processes and are not limited to any particular application. The subject circuits therefore offer means for providing solutions to complex problems having many variables. Compared to digital, analog and other types of devices having similar capabilities, the subject circuits are characterized by being relatively smaller, more compact, lighter weight and less expensive to construct. The present circuits also have relatively low power consumption and they require little or no peripheral equipment such as storage and computing means as do other types of equipment. Instead, the subject circuits can operate as integral units receiving inputs directly from other known and existing types of equipment such as temperature, pressure, and other similar direct reading devices. The subject circuits can also operate on real or stored information and can be used to control or monitor conditions as well as operations. One of the important things is that the subject circuits retain a remembrance of past history which it is able to take into account in a simulated decision making function.

Thus there has been shown and described a novel control circuit capable of simulating learning and forgetting processes which fulfills all of the objects and advantages sought therefor. Many changes, modifications, alterations, variations and other uses and applications of the subject device will, however, become apparent to those skilled in the art after considering this specification and the accompanying drawing. All such changes, modifications, alterations, variations and other uses and applications which do not depart from the spirit and scope of the invention are deemed to be covered by the invention which is limited only by the claims which follow.

What is claimed is:

1. Means for simulating a learning process comprising an electronic circuit having an input adapted to be connected to a source of input signals, an integrating circuit connected to the input circuit and including means capable of charging at a predetermined charging rate in response to and during receipt of input signals, means actuated by the charge on the integrating means reaching a predetermined charge, and means for dissipating a charge on said integrating circuit, said charge dissipating means including means for selectively changing the charge dissipation rate, said means for changing the charge dissipation rate including first relatively high impedance means connected to provide a charge dissipation rate that is substantially slower than the charging rate of the charging means, and other charge dissipating means including said means activated by a predetermined charge on the integrating circuit and a bi-stable flip-flop circuit under control thereof, means connecting said bi-stable flip-flop circuit to the charging means, said flip-flop circuit having a relatively high impedance in the deactivated condition thereof so that the first relatively high impedance means controls the charge dissipation rate of the integrating circuit and a relatively low impedance in the activated condition to accelerate the charge dissipation rate.

2. The simulated learing means defined in claim 1 wherein said means actuated in response to a predetermined charge includes a semi-conductor element operatively connected to the integrating circuit.

3. The simulated learing means defined in claim 1 wherein said means for dissipating a charge on the integrating circuit includes a second variable impedance circuit connected to the integrating circuit including a second bi-stable circuit and a separate source of control inputs therefor, the impedance of said second bi-stable circuit in the conducting condition thereof preventing charging of the integrating circuit by input signals at its source.

4. A control circuit having an input adapted to be connected to a source of input signals said input source including an "and" gate, means capable of charging at a predetermined charging rate in response to receipt and during the occurrence of input signals generated when an "and" input condition exists at the input, means including a bi-stable thresold circuit connected to the charging means, said threshold circuit going from a non-conducting to a conducting condition whenever the charge on the charging means reaches a predetermined value, said threshold circuit producing an output every time it goes to its conducting condition, and means for dissipating the charge on the charging means at a rate that is different from the predetermined rate said threshold circuit including means for accelerating the charge dissipation rate when in its conducting condition, and other means for inhibiting the charging of the charging means by the input signals.

5. The control circuit defined in claim 4 wherein said means for dissipating the charge includes fixed impedance means connected to provide a path for dissipating a charging on the charging means.

6. Means for monitoring a condition represented by impulses the frequency of which is proportional thereto, said monitoring means including a circuit having an element capable of being charged at a predetermined charging rate by said impulses, an impedance circuit connected to dissipate a charge on said element between impulses, means responsive to the occurrence of a predetermined charge on said element, said last named means including means producing an output signal whenever the charge on said element reaches said predetermined charge, an output circuit responsive to said output signals, and means for changing the rate of charge dissipation of said element said last named means including a bi-stable member capable of being in a high impedance non-conducting or in a low impedance conducting condition, and separate input means for controlling the condition of said member.

7. The means for monitoring a condition defined in claim 6 wherein the conducting impedance of said bi-stable member is low enough to accelerate the discharge rate so that it is faster than the charging rate of the element.

8. Means for retaining a recollection of past information received comprising a circuit having input connections to sources of input impulses representing a condition to be monitored, charge storage means in said circuit capable of being charged by said input impulses at a predetermined charging rate, first means for dissipating a charge on the charge storage means at a different slower rate, means responsive to the occurrence of a predetermined charge on said charge storage means to produce output impulses, and other means for selectively accelerating the charge dissipation rate of said charge storage means, said other means including a controlled bi-stable circuit connected in parallel with the first charge dissipating means, said controlled bi-stable circuit including a circuit element having a relatively high non-conducting impedance, and other input means for controlling the condition of said circuit element.

9. The means defined in claim 8 wherein a plurality of similar circuits are connected to respond to impulses representing different conditions to be monitored, each of said circuits having similar charge storage means capable of being charged by input impulses representing a particular condition and each of said circuits including means responsive to establishment of a predetermined charge on the associated charge storage means to produce an output impulse, and means responsive to the output impulses of a plurality of said circuits including gating circuit means and bi-stable means.

10. The means defined in claim 8 wherein means are provided for using the output impulses of said circuit as the input impulses for a similar circuit.

11. Electronic means capable of simulating a learning process comprising an input circuit adapted to be connected to a source of input signals the frequency and intensity of which vary according to the operating condition to be monitored, a charge integrated circuit connected to the input circuit and adapted to be charged by and during receipt of input signals, means actuated in response to the establishment of a predetermined charge on the integrating circuit, and other means for dissipating a charge on the integrating circuit, said last named means including means for selectively changing the charge dissipation rate, said means for selectively changing the charge dissipation rate including a second integrating circuit and a second input signal source therefor, means responsive to the establishment of a predetermined charge on said second integrating circuit, said charge responsive means including an impedance device capable of going from a relatively high to a relatively low impedance in response to the occurrence of said predetermined charge on said second integrating circuit, and means connecting said impedance device to the aforesaid integrating circuit to provide a charge dissipation path therefor.

12. The electronic means defined in claim 11 including a bi-stable output circuit connected to respond to the occurrence of a predetermined charge on the integrating circuit.

13. Means for monitoring a variable condition represented by impulses the frequency of which vary in proportion to the condition, comprising a circuit including capacitor means capable of being charged by the impulses at a predetermined charging rate, means responsive to the establishment of a predetermined charge on said capacitor means including a semi-conductor element having an operative connection to said capacitor means, said semiconductor element going from a non-conducting to a conducting condition in response to the establishment of said predetermined charge on said capacitor means, bi-stable means connected to said semi-conductor element and responsive to a change in the conducting condition thereof, first means for dissipating a charge on the capacitor means at a first discharge rate when the charge thereon is less than the predetermined charge, and means for selectively accelerating the charge dissipation rate including a discharge circuit connected to the capacitor means, said discharge circuit including second capacitor means and a second source of impulses for charging said second capacitor means, and a variable impedance device connected to respond to the occurrence of a predetermined charge on said second capacitor means.

References Cited

UNITED STATES PATENTS

| 2,981,893 | 4/1961 | Agalides et al. | 328—196 |
| 3,054,003 | 9/1962 | Pagano et al. | 328—196 |
| 3,073,972 | 1/1963 | Jenkins | 307—88.5 |
| 3,097,349 | 7/1963 | Putzrath et al. | 340—172.5 |
| 3,204,153 | 8/1965 | Tygart | 317—148.5 |

J. S. HEYMAN, *Primary Examiner.*

ARTHUR GAUSS, *Examiner.*

S. D. MILLER, *Assistant Examiner.*